United States Patent [19]
Harrison

[11] Patent Number: 4,766,981
[45] Date of Patent: Aug. 30, 1988

[54] DISC BRAKES

[75] Inventor: Anthony W. Harrison, Birmingham, England

[73] Assignee: Lucas Industries public limited company, Birmingham, England

[21] Appl. No.: 936,591

[22] Filed: Dec. 1, 1986

[30] Foreign Application Priority Data

Nov. 29, 1985 [GB] United Kingdom ............. 8529474

[51] Int. Cl.[4] ............................................. F16D 55/00
[52] U.S. Cl. ................................ 188/170; 188/73.47; 188/73.34
[58] Field of Search ............... 188/216, 72.3, 170, 188/171, 166, 167, 72.1, 72.6, 17, 18 A, 71.1, 70 R, 73.35, 73.37, 73.43, 72.1, 72.6, 106 F, 73.34, 73.39

[56] References Cited

U.S. PATENT DOCUMENTS

| | | | |
|---|---|---|---|
| 3,188,922 | 6/1965 | Cruse | 188/170 |
| 3,480,116 | 11/1969 | Rath | 188/73.35 |
| 3,661,230 | 5/1972 | Burnett | 188/170 |
| 4,014,414 | 3/1977 | Yamamoto et al. | 188/170 |
| 4,034,858 | 7/1977 | Rath | 188/73.34 |
| 4,485,897 | 12/1984 | Kawaguchi et al. | 188/73.39 |

FOREIGN PATENT DOCUMENTS 2017266 4/1970 Fed. Rep. of Germany ...... 188/216

Primary Examiner—Andres Kashnikow
Assistant Examiner—Mark T. Le
Attorney, Agent, or Firm—Scrivener and Clarke

[57] ABSTRACT

The present invention relates to a disc brake for use on a railway vehicle. The brake includes a service brake for normal brake applications and an auxiliary or parking brake which is spring applied and hydraulically or pneumatically released. The disc brake includes a caliper supporting a service brake actuator and an auxiliary brake actuator arranged to apply opposed friction pads to opposite sides of a braking disc. The auxiliary brake actuator consists of one or more spring elements which engage around outer peripheral regions of the caliper and grip the caliper to apply spring force to the pads from the exterior of the caliper, the spring elements being releasable by a hydraulic or pneumatic piston such that the spring force of the spring elements is then reacted through the caliper. By this arrangement of spring elements, the spring elements being preferably located in grooves on the outer surface of the caliper, a compact disc brake construction is achieved.

19 Claims, 3 Drawing Sheets

DISC BRAKES

The present invention relates to a disc brake for use on a vehicle.

In particular the present invention relates to a disc brake suitable for use on a railway vehicle, the brake comprising a service brake for normal brake applications and an auxiliary or parking brake which is spring applied and hydraulically or pneumatically released. The service brake may be also spring applied and hydraulically or pneumatically released, or it may be solely controlled by a hydraulic system.

Known service and auxiliary brake installations are relatively bulky and the main objective of the present invention is to reduce the required installation space.

According to the present invention there is provided a disc brake comprising a caliper supporting a service brake actuator and an auxiliary brake actuator arranged to apply opposed friction pads to opposite sides of a braking disc, the auxiliary brake actuator comprising a spring element which grips the caliperand applies spring force to said friction pads, said spring element being releasable by hydraulic means such that the spring force of the spring element is then reacted through the caliper.

In the present invention the spring force is transferred from the caliper to the friction pads when the said hydraulic means are released, the spring force preferably acting via an automatic adjuster designed to cancel the effect of pad wear on the spring travel.

In a preferred embodiment of the present invention the caliper straddles the braking disc with the service brake actuator and the auxiliary brake actuator located in the caliper on one side of the disc. Considering the auxiliary brake actuator, two wire spring elements virtually encompass the caliper around outer peripheral regions thereof, straddling the disc and engaging a thrust block via which the spring force can be applied to the friction pads from the exterior of the caliper. Short-stroke hydraulic means are arranged to lift the spring force off the thrust block, thus releasing the auxiliary brake, the spring force then being reacted through the caliper. The auxiliary brake is thus simply applied by releasing said hydraulic means.

In one form of this preferred embodiment of the present invention the said hydraulic means comprises a pair of hydraulic pistons located in cylinders formed in the caliper, the pistons each engaging one of the springs so that the spring force can be lifted off the thrust block by the introduction of pressurised hydraulic fluid into said cylinders. The thrust block is connected to a main piston via an automatic adjuster so that the main piston can act directly on one friction pad and reactively through the caliper on the other opposed friction pad. When the pressure on the hydraulic fluid in said cylinders is reduced/released the main piston applies the friction pads under the action of said springs. For service brake application with the springs being reacted through the caliper by said hydraulic pistons and cylinders, hydraulic pressure may be applied between the thrust block and said main piston to apply the main piston to the friction pads.

In another form of the preferred embodiment of the present invention, the thrust block is formed as a hollow piston which is closed at one end and open at the other end, said hollow piston having a reduced diameter outer periphery adjacent to said open end. The thrust block is axially slidable in a bore in the caliper with the springs engaging the closed end of the thrust block; the caliper bore having a reduced diameter portion into which the reduced diameter region of the thrust block sealingly engages. The annular space defined by the reduced diameter region of the thrust block, the caliper bore and the shoulders formed by the reduced diameter portion of both caliper bore and thrust block, is connectible to a source of pressurized hydraulic fluid and forms said hydraulic means operative to react the spring force of said springs through the caliper, releasing the auxiliary brake. Said hollow piston defines an axial cylinder within which a main piston is axially slidable, said main piston projecting from the open end of the thrust block and being engagable with one friction pad direct. Said main piston is connected to the thrust block via an automatic adjuster and is operable as a service brake actuator by the introduction of pressurised hydraulic fluid into the axial cylinder in said main piston.

In a further form of the preferred embodiment of the present invention, the thrust block is formed as a hollow piston which is closed at one end and open at the other end. Said hollow piston is axially slidable in a bore in the caliper with the springs engaging the closed end of the thrust block. Said thrust block defines an axial cylinder within which a main piston is axially slidable, said main piston projecting from the open end of the thrust block and being axially slidably and sealingly engaged in a reduced diameter section of said caliper bore. The main piston projects beyond said reduced diameter section of said caliper bore and directly engages a friction pad. Seals are provided between the caliper bore and the thrust block, between the caliper bore and the main piston, and between the axial cylinder and said main piston. By introducing hydraulic fluid into the caliper bore the thrust block can lift the springs, reacting the spring force through the caliper and thus releasing the auxiliary brake. Then by the introduction of pressurised hydraulic fluid into the axial cylinder within the thrust block the main piston can be moved to operate the service brake. When required hydraulic pressure in the caliper bore can be released to allow the springs to act via the thrust block and an automatic adjuster on the main piston, i.e. the auxiliary brake is operated.

In a still further form of the preferred embodiment of the present invention the thrust block is constructed as a piston which is sealingly axially slidable in a bore in the caliper, the thrust block piston being connected by an automatic adjuster to an elongate extension which extends sealingly through an axial bore formed in a main piston which is likewise sealingly axially slidable in said caliper bore. Said main piston has a reduced diameter portion which extends sealingly through a reduced diameter portion of said caliper bore, said reduced diameter portion and said elongate extension projecting beyond said caliper bore to engage a friction pad. In use, pressurised hydraulic fluid can be introduced between said pistons to react the spring force through the caliper, thus releasing the auxiliary brake, and the service brake may be also spring applied by releasing hydraulic pressure from the other side of said main piston and at least maintaining the hydraulic pressure between the pistons. Alternatively hydraulic pressure between the pistons may be varied to apply the service brake, and the hydraulic pressure on said other side of the main piston may be varied to operate the auxiliary brake.

As will be appreciated the calipers in the above described forms of the preferred embodiment of the present invention must be movable axially of the braking disc to allow for reactive operation. The caliper is therefore preferably mounted on a Y-shaped support member at its leading end region with respect to the forward direction of movement of the vehicle to which the brake is attached. A pin extending parallel to the axis of the braking disc extends between the arms of the Y-shaped support member and through a bore in the leading end region of the caliper. The trailing end region of the caliper is preferably mounted on a tie rod support which is flexibly coupled at one end to the trailing end region of the caliper and flexibly coupled at its other end to a fixed support. Thus the caliper can slide axially of the disc on the pin whilst the tie rod tilts; the flexible mounting of the tie rod reducing any possibility of the caliper jamming on the pin as can happen when two parallel pin sliding connections are used.

To save further space in the installation the two springs of the preferred embodiment are preferably each engaged in channels formed in the caliper surface and defining the outer peripheral region for the springs. Preferably the springs and channels each have generally square transverse cross-sections and rubber supports are preferably interposed between the springs and the respective channel walls to reduce noise and wear.

The present invention will now be further described, by way of example, with reference to the accompanying drawings, in which.

Figure 1:
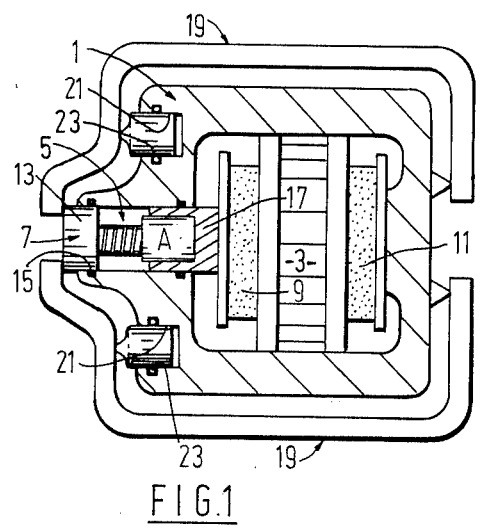
FIG. 1 is a schematic cross-sectional view of one embodiment of a brake constructed according to the present invention.

The brakes illustrated in FIGS. 1 to 4 of the accompanying drawings each comprise a reactive caliper bridge 1 which is arranged to straddle a braking disc 3. A service brake actuator 5 and an auxiliary brake actuator 7 are located in the caliper 1 on one side of the braking disc 3, to directly act on a friction pad 9; the caliper 1 being movable axially of the disc to allow the other friction pad 11 to reactively act on the other side of the braking disc. The auxiliary brake actuator 7 comprises a thrust block 13 which is axially slidably mounted in a bore 15 in the caliper 1, the thrust block 13 being connected via an automatic adjuster A to a main piston 17 which directly engages friction pad 9. Two shaped wire springs 19 encompass the caliper 1 and engage the thrust block 13, the springs 19 providing the spring force to apply the auxiliary brake.

FIGS. 1 to 4 schematically illustrate four different embodiments of hydraulic means for releasing the auxiliary brake, together with different actuation means for the service brake.

In FIG. 1 both the thrust block 13 and the main piston 17 are axially slidable in the caliper bore 15, caliper bore 15 having a constant diameter throughout its length. To lift the springs 19 off thrust block 13 and release the auxiliary brake, hydraulic means in the form of two hydraulic piston and cylinder arrangements 21,23 are provided. Each piston and cylinder arrangement comprises blind bore cylinder 21 in the caliper 1, with a piston 23 axially slidable therein. The pistons 23 project out of their respective cylinders 21 and engage against a respective spring. By introducing pressurised hydraulic fluid into the cylinders 21 the pistons 23 lift the springs off the thrust block 13 releasing the auxiliary brake; the spring force being reacted through the caliper 1. Then by introducing pressurised hydraulic fluid into the caliper bore 15 between the thrust block 13 and the main piston 17, the service brake is applied. The auxiliary brake can be subsequently re-applied by releasing the hydraulic pressure in cylinders 21.

Figure 2:
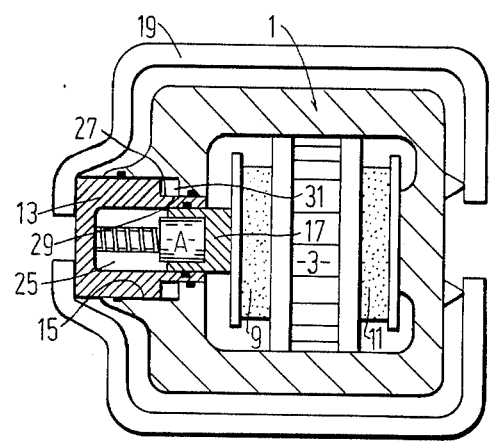
FIG. 2 is a schematic cross-sectional view of another embodiment of a brake constructed according to the present invention.

In FIG. 2, the thrust block 13 is in the form of a hollow piston which is closed at one end and open at the other, the interior of the hollow piston forming an axial cylinder 25 within which the main piston 17 is axially, sealingly, slidable. The main piston 17 is connected to the thrust block 13 via an automatic adjuster A, and projects out of the open end of the axial cylinder 25 to engage friction pad 9. The thrust block 13 has a reduced diameter outer periphery 27 adjacent to its open end, this reduced diameter outer periphery 27 sealingly engaging in a reduced diameter portion 29 of the caliper bore 15. This construction defines an annular chamber 31 between the reduced diameter outer periphery 27 and the caliper bore 15, which chamber 31 is connected to a source of hydraulic pressure fluid and forms the hydraulic means for lifting the thrust block 13 to relieve the spring load from the pad 9 and reacting the spring force through the caliper 1. To operate the service brake pressurised hydraulic fluid is fed into and released from the axial cylinder 25 to control the action of the main piston 17 against friction pad 9. To reapply the auxilary brake pressure is released from annular chamber 31 to allow the springs 19 to act on the friction pads.

Figure 3:
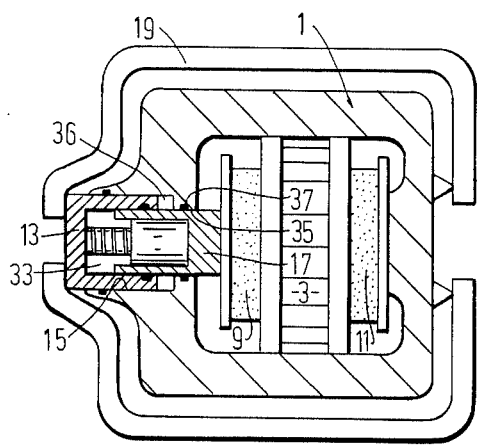
FIG. 3 is a schematic cross-sectional view of a further embodiment of a brake constructed according to the present invention.

In FIG. 3, the thrust block 13 is again in the form of a hollow piston which is closed at one end and open at the other, the interior of the hollow piston forming an axial cylinder 33 within which the main piston 17 is axially sealingly slidable. The main piston 17 is connected to the thrust block 13 via an automatic adjuster A and projects out of the axial cylinder 33, sealingly through a reduced diameter portion 35 of the caliper bore 15, to engage friction pad 9. By introducing pressurised hydraulic fluid into the caliper bore 15 in the region 36 between the thrust block 13 and said reduced diameter portion 35 the thrust block can react the force of the springs 19 through the caliper 1, releasing the auxiliary brake. By introducing or releasing pressurised fluid from axial cylinder 33 the main piston 17 can be moved to control the service brake. To reapply the auxiliary brake the fluid pressure in the caliper bore region 36 is released allowing the springs 19 to act on the friction pads. Whilst seals are appropriately positioned, a seal 37 between the main piston 17 and the reduced diameter portion 35 of the caliper bore 15 has to be especially durable as it has to cater for the full auxiliary brake release pressure in region 36 and at the same time the full stroke of piston 17 on every service brake application.

Figure 4:
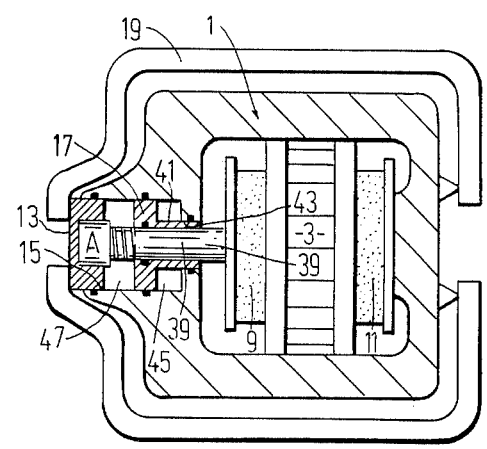
FIG. 4 is a schematic cross-sectional view of a still further embodiment of a brake constructed according to the present invention.

In FIG. 4, the thrust block 13 is attached via an automatic adjuster A to an elongate, axially extending extension 39 which extends sealingly and axially slidably through a bore in the main piston 17, to engage friction pad 9; the main piston 17 being sealingly axially slidable in the caliper bore 15 and having a reduced diameter portion 41 which extends sealingly and slidably within a reduced diameter region 43 of the caliper bore 15. By retaining a fixed amount of hydraulic fluid in the annular cavity 45 between the main piston 17 and the reduced diameter region 43 of the caliper bore 15, hydraulic pressure can be increased in chamber 47 between the thrust member 13 and main piston 17, to react the spring force through the caliper 1 and release the auxiliary brake. By releasing fluid from cavity 45 the service brake can be operated by the force of the springs 19, requiring an increase in fluid pressure in cavity 45 to release the service brake. As will be appreciated, the roles of cavities 45 and 47 can be reversed to provide for the required spring application of either auxiliary or service brake.

Figure 5:
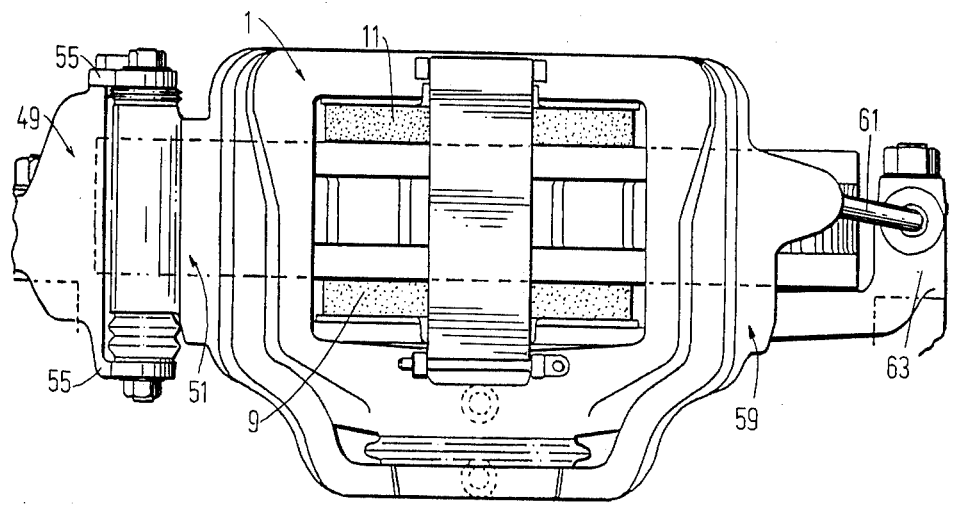
FIG. 5 is a plan view of a brake constructed according to the present invention.
Figure 6:
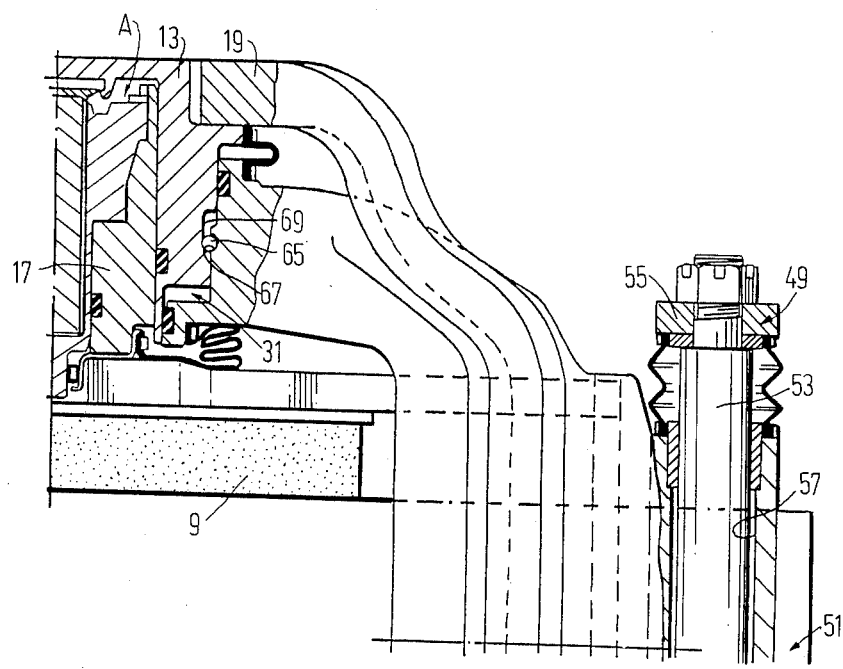
FIG. 6 is a cross-sectional view of part of the brake of FIG. 5.
Figure 7:
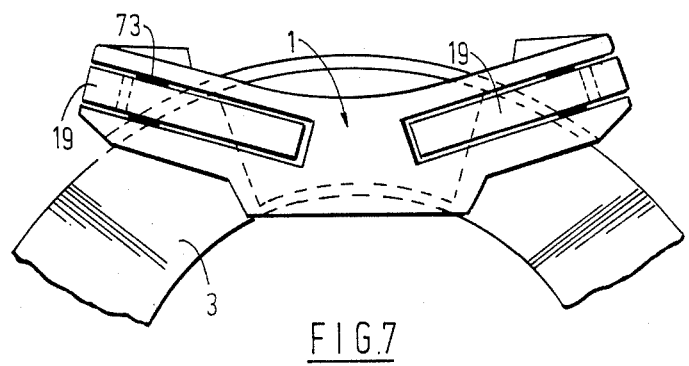
FIG. 7 illustrates the spring and caliper arrangement of the brake of FIGS. 5 and 6.
Figure 8:
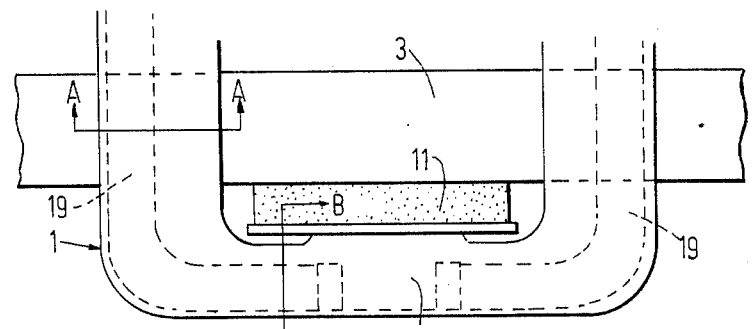
FIG. 8 is a schematic plan view of part of the caliper of FIGS. 5 and 6.

The brake constructed according to the present invention and illustrated in FIGS. 5 and 6 of the accompanying drawings comprises a caliper 1 which is mounted on a Y-shaped support member 49 at its leading end region 51 taken with respect to the forward direction of travel of the vehicle on which the brake is mounted. The support member 49 has a pin 53 extending parallel to the axis of the braking disc 3, the pin 53 extending between the arms 55 of the Y-shape and through a bore 57 in said leading end region 51 of the caliper 1. The trailing end region 59 of the caliper 1 is supported on an elongate tie rod 61, one end region of which is flexibly mounted, for example by a rubber coupling, to said trailing end region 59, the other end region being flexibly mounted on a fixed support 63. Thus, when reactively pressing the friction pads 9,11 against the braking disc 3, the caliper 1 can slide axially of the disc 3 on the pin 53, the tie rod 61 tilting to accommodate the movement and pad wear. By using the flexibly mounted tie rod 61 at one end of the caliper 1, the possibility of the caliper jamming on the pin 53 is reduced.

As seen from FIG. 6, the service brake and auxiliary brake actuators are of the same design as schematically illustrated in FIG. 2. Outward movement of the thrust block 13 is limited by ring 65 which engages in an annular groove 67 in the wall of the caliper bore 15 and in an annular channel 69 in the periphery of the thrust block 13. As previously described the thrust block 13 engages springs 19 and connects with a main piston 17 via an automatic adjuster A; the main piston 17 pressing against friction pad 9 to act as the auxiliary brake when hydraulic pressure in annular chamber 31 is released.

Figure 9:
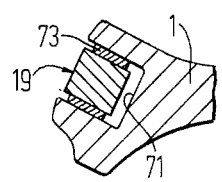
FIG. 9 is a cross-sectional view along line A—A in FIG. 8, of part of the spring and caliper of FIG. 7.
Figure 10:
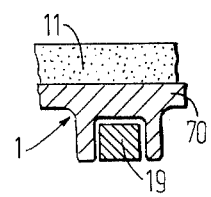
FIG. 10 is a cross-sectional view taken along line B—B in FIG. 9.

Referring to FIGS. 7 to 10 of the accompanying drawings, space is saved in respect of overall dimensions, by the location of the springs 19 in substantially complimentary channels 71 formed in the outer wall of the caliper 1. Further, a compact outer caliper beam 70 (see FIG. 10) can be achieved to additionally save space without affecting strength and performance. As can be seen in FIG. 9, rubber supports 73 are located between the springs 19 and the walls of the channels 71, these rubber supports reducing noise and wear as the springs flex.

The present invention thus provides a space saving version of a brake including a spring applied/hydraulically released auxiliary brake, together with a service brake which can be spring or hydraulically operated.

I claim:

1. A disc brake comprising a caliper supporting a service brake actuator and an auxiliary brake actuator arranged to apply opposed friction pads to opposite sides of a braking disc, the auxiliary brake actuator comprising a spring element which grips the caliper around an outer peripheral region thereof and applies spring force to said friction pads from the exterior of said caliper, said spring element being releasable by hydraulic means such that the spring force of the spring element is then reacted through the caliper.

2. A disc brake according to claim 1, wherein the spring element engages both the caliper and a thrust block via which the spring force can be applied to the friction pads, when said hydraulic means are released.

3. A disc brake according to claim 1, wherein the spring element acts on said friction pads via an automatic adjuster, when said hydraulic means are released.

4. A disc brake according to claim 1, wherein the caliper straddles the disc with the service brake actuator and the auxiliary brake actuator located in the caliper, on one side of the disc.

5. A disc brake according to claim 2, wherein said hydraulic means comprises a piston located in a cylinder formed in the caliper, the piston engaging the spring element so that the spring force can be lifted off the thrust block by the introduction of pressurised hydraulic fluid into said cylinder.

6. A disc brake according to claim 2, wherein the thrust block is formed as a hollow piston which is closed at one end and open at the other end, said hollow piston having a reduced diameter outer periphery adjacent to said open end and being axially slidable in a bore in the caliper with the spring element engaging the closed end of the thrust block, said bore having a reduced diameter portion into which the reduced diameter region of the thrust block sealingly engages, an annular space defined by the reduced diameter region of the thrust block, the caliper bore and the shoulders formed by the reduced diameter portion of both caliper bore and thrust block, being connectible to a source of pressurised hydraulic fluid to form said hydraulic means.

7. A disc brake according to claim 6, wherein said hollow piston defines an axial cylinder within which a main piston is axially slidable, said main piston projecting from the open end of the thrust block and being engageable with one friction pad direct.

8. A disc brake according to claim 7, wherein said main piston is connected to the thrust block by an adjuster.

9. A disc brake according to claim 2, wherein the thrust block is formed as a hollow piston which is closed at one end and open at the other end, said hollow piston being axially slidable in a bore in the caliper with the spring element engaging the closed end of the hollow piston, said hollow piston defining an axial cylinder within which a main piston is axially slidable, said main piston projecting from the open end of the thrust block and being axially slidably and sealingly engaged in a reduced diameter section of the caliper bore, said main piston also projecting beyond said reduced diameter section and engaging a friction pad, said caliper bore being connectible to a source of pressurised hydraulic fluid to form said hydraulic means.

10. A disc brake according to claim 9, wherein seals are provided between the caliper bore and the thrust block, between the caliper bore and the main piston and between said axial cylinder and the main piston.

11. A disc brake according to claim 9, wherein said main piston is connected to the thrust block by an adjuster.

12. A disc brake according to claim 2, wherein the thrust block is constructed as a piston which is sealingly axially slidable in a bore in the caliper, the thrust block being connected by an adjuster to an elongate extension which extends sealingly through an axial bore formed in a main piston which is likewise sealingly axially slidable in the caliper bore, said main piston having a reduced diameter portion which extends sealingly through a reduced diameter portion of the caliper bore, said reduced diameter piston portion and said elongate extension projecting out of said caliper bore to be engageable with a friction pad.

13. A disc brake according to claim 12, wherein a source of pressurised hydraulic fluid is connectible to the region of the caliper bore between said pistons for controlling auxiliary brake operation, and a further source of pressurised hydraulic fluid is connectible to the region of the caliper bore between said main piston and the reduced diameter region of the caliper bore, for controlling service brake operation.

14. A disc brake according to claim 12, wherein a source of pressurised hydraulic fluid is connectible to the region of the caliper bore between said pistons for controlling service brake operation, and a further source of pressurised hydraulic fluid is connectible to the region of the caliper bore between said main piston and the reduced diameter region of the caliper bore, for controlling auxiliary brake operation.

15. A disc brake according to claim 2, wherein the caliper is mounted on a Y-shaped support member at its leading end region having regard to the rotation of the disc corresponding to forward motion, a pin lying parallel to the axis of the braking disc extending between the arms of the Y-shaped support member and through a bore in the caliper, the trailing end region of the caliper being mounted via a flexible coupling on one end region of an elongate member, the other end region of said elongate member being flexibly coupled to a fixed member.

16. A disc brake according to claim 1, wherein said outer peripheral region comprising a channel formed in the external surface of the caliper, said spring element being located in said channel.

17. A disc brake according to claim 16, wherein said spring element has a square transverse cross-section and said channel is of similar transverse cross-section.

18. A disc brake according to claim 17, wherein resilient supports are located between said spring element and a wall of said channel.

19. A disc brake according to claim 1, wherein two spring elements are provided, said elements being elongated and bent to engage around respective different outer peripheral regions of the caliper.

* * * * *